Sept. 29, 1931.  G. N. VAN DERHOEF  1,825,293
SHAFT SUPPORT
Filed Sept. 27, 1926
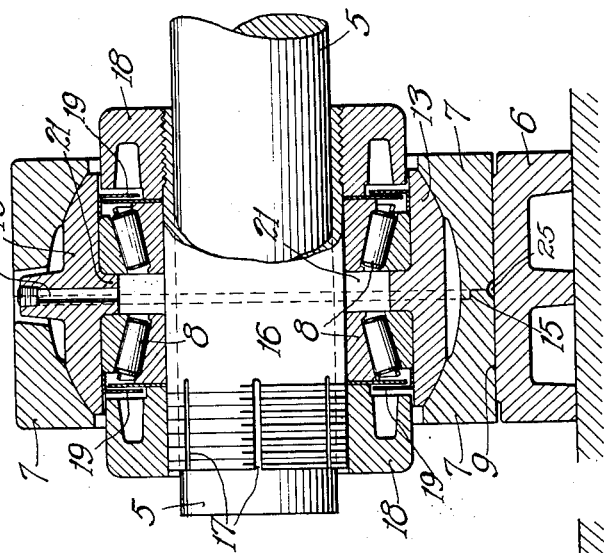
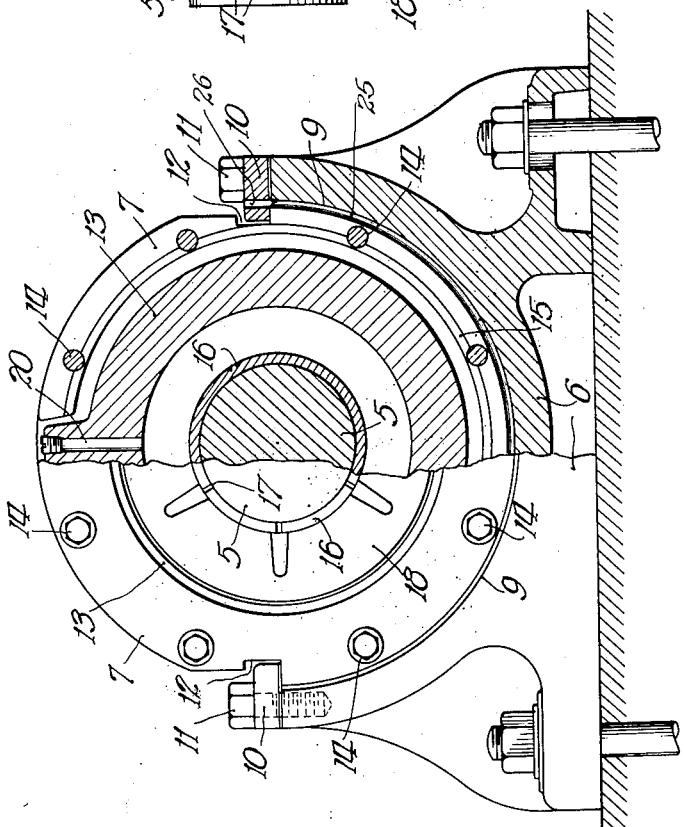
Inventor.
George N. Van Derhoef.

Patented Sept. 29, 1931

1,825,293

UNITED STATES PATENT OFFICE

GEORGE N. VAN DERHOEF, OF MISHAWAKA, INDIANA, ASSIGNOR TO DODGE MANUFACTURING CORPORATION, A CORPORATION OF DELAWARE

SHAFT SUPPORT

Application filed September 27, 1926. Serial No. 137,942.

This invention relates to shaft supports, and aims to provide a support of simple construction which will permit linear expansion or contraction of the shaft due to temperature changes without undue strain on any of its parts and without deflection of the shaft.

The invention may be understood by reference to one illustrative embodiment shown in the accompanying drawings, in which:

Fig. 1 is a sectional elevation of a pillow block; and

Fig. 2 is a vertical section of the same taken in the direction of the shaft axis.

As the amount of linear expansion of a shaft due to a rise in temperature depends directly on the length of the shaft, it follows that the longer a shaft is, the more serious is the problem of providing for its support at all temperatures, while preventing longitudinal shifting of the shaft due to thrusts from a heavy, fluctuating load. The invention provides a shaft support useful with shafts of any length, although subjected to temperature extremes; and it may be embodied in different forms, including pillow blocks, drop hangers, post hangers and bracket hangers.

Referring more specifically to the drawings, there is shown for illustration a pillow block so made as to permit thermal expansion of the shaft 5 which it supports. The pillow block consists of the following principal parts, viz., a fixed chair or rest 6, a housing 7 which is supported upon the chair or rest, and a bearing or bearings 8 carried by the housing and surrounding shaft 5. The chair or rest permits the housing to move responsive to thermal expansion or contraction of the shaft, to which the housing is secured in such a way as to prevent relative longitudinal movement, as will be described.

While the chair or rest may assume various forms, I prefer to have it so made as to be capable of being bolted to a floor or foundation, as shown, and I further prefer that a seat of relatively large area be provided for the housing, so as to insure stability. For manufacturing reasons, and to facilitate assembly and disassembly, a semi-cylindrical seat 9 is provided, on which the housing rests and from which it may be lifted. The housing is generally cylindrical as shown, to slide over the seat under certain conditions, but is prevented from turning by arms 10, secured by bolts 11 to the upper edges of the chair or rest, and entering slots 12 in the housing which extend longitudinally parallel to the shaft axis. Thus the housing is normally immovably held upon the relatively large seat, but may slide thereon responsive to the high stresses set up by thermal expansion.

While the housing 7 may be directly in contact with the bearings, it is preferable to provide means to aid in alining the shaft, and hence an inner housing 13 is interposed between housing 7 and the bearings and has a "ball and socket" connection with housing 7. To facilitate assembly, the outer housing is made up of two similar annular parts on opposite sides of the inner housing, secured together by bolts 14 tending parallel to the shaft. A rabbeted joint 15 may serve to aline the two halves of the housing. The inner housing 13 may be a solid piece turned to present two surfaces which are segments of spheres and which rest upon similar surfaces turned interiorly of the housing 7, as will be clear from Fig. 2. As the shaft and the inner housing are secured together, a slight rocking of the shaft in any direction is permitted, facilitating erection. When the shaft has once been alined, it will maintain the alinement because of the strength and rigidity of the parts.

Between housing 7 and the shaft (or housing 13 and the shaft, as shown) are the bearings. While an ordinary sleeve of babbitt or the like may be used, I prefer to employ tapered roller bearings of a known type and prefer to mount and secure these bearings as disclosed in the A. P. Strong Patent No. 1,687,806, of October 16, 1928. Briefly, the bearings 8 (which are units each comprising an inner race or cone, an outer race or cup, tapered rollers, and a keeper or spacer for the rollers), are fitted tightly within the housing 7 (or 13) and also closely fit a tube 16 which in turn closely fits the shaft. To secure the tube and bearings, the tube has longitudinal slots 17 at both ends extending for a fraction of its length and it is screw threaded at both ends as far as the slots 17 extend. Two similar contractible collars 18 (whose precise construction is disclosed in the above named Strong patent) are screwed on the ends of tube 16 to contract said tube ends so that the tube cannot shift or turn on the shaft. The collars 18 also press against the cones of the bearings, as shown, not only to prevent movement of the bearings on the tube but also to permit factory adjustment of the bearings. Grease seals 19 may be interposed between the collars and the bearings to keep out dust and to prevent escape of grease, which may be introduced through a duct 20 in the inner housing. To hold the bearings properly spaced and to cause the inner housing to move with the shaft (except for rotation), a rib 21, which may be circular, is formed on the inner surface of said housing.

Extending around the lower periphery of the outer housing member 7 is provided an oil groove 25 and the arms 10 are provided with apertures 26 in communication therewith when the structure is in assembled condition. Lubricant may be introduced through the openings 26 and flow around the groove 25 to lubricate the surfaces of contact of the housing member 7 and chair 6 to reduce the frictional resistance which might otherwise obtain to sliding of the housing 7 on the chair.

It will be clear that the described construction is particularly well adapted for severe service and will allow longitudinal expansion and contraction of a shaft exposed to all extremes of temperature, without loss of efficiency of the bearings, and without deflection of the shaft.

Obviously the present invention is not restricted to the particular embodiment thereof herein shown and described. Moreover, it is not indispensable that all the features of the invention be used conjointly since they may be employed advantageously in various combinations and sub-combinations as defined in the claims.

What is claimed is:

1. Shaft supporting means comprising a chair having a semi-circular recess, a housing member mounted in said recess and slidable axially with respect to said chair, bearing means carried by said housing for journaling of a shaft or the like, and means to secure said housing in said chair recess against rotation relative thereto, said means comprising arms detachably secured to said chair, said housing being provided with means for engagement by said arms.

2. Shaft supporting means comprising a chair having a semi-circular recess, a housing member mounted in said recess and slidable axially with respect to said chair, bearing means carried by said housing for journaling of a shaft or the like, and means to secure said housing in said chair recess against rotation relative thereto, said means comprising engaging members detachably secured to said chair, said housing being recessed for engagement by said members.

3. Shaft supporting means comprising a pair of members, one a chair having a recess therein, the other a housing member mounted in said recess for sliding movement relative thereto, bearing means carried by said housing for journaling of a shaft or the like, one of said members being provided with a groove to convey oil to the contacting surfaces of said members, and locking members detachably associated with said chair to engage said housing to prevent relative rotation thereof, said locking members being provided with apertures in communication with said groove.

4. A shaft bearing device comprising two adjacent symmetrical trains of tapered bearing rollers, concentric bearing rings therefor, a shaft sleeve on which is fitted the inner of said rings, concentric housing rings in the inner of which the outer bearing rings are fitted, said housing ring having means cooperative with the outer of the bearing rings and said sleeve having means cooperative with the inner of the bearing rings for positioning the bearing parts in operative assembly with said sleeve and inner housing ring, one of said means adjustable for adjusting the bearing to take up wear, and a support in which the outer housing ring is mounted, said support and housing rings being movably fitted in one another, two of said last three mentioned elements having contacting spherical surfaces concentric with the bearing to allow relative universal angular play, and another two of said elements being slidably fitted for relative play in an axial direction, whereby the inner housing ring with the contained bearing is self-adjustable to suit the shaft alinement and movable with the shaft in response to shaft contraction and expansion.

5. A shaft bearing device comprising two adjacent symmetrical trains of tapered bearing rollers, concentric bearing rings therefor, concentric housing rings in the inner of which the outer bearing rings are fitted, said inner housing ring having an internal rib abutted by the outer bearing rings, a shaft sleeve on which the inner bearing rings are fitted, said sleeve having split threaded ends, contractile collars screwed on said ends cooperating with the inner bearing rings for positioning the bearing, means for contracting said collars to secure the sleeve on a shaft, locking means for said collars to secure a desired adjustment of the bearing, and a support for the outer housing ring, said support and housing rings being movably fitted in one another, two of said last three mentioned elements having contacting spherical surfaces concentric with the bearing to allow relative universal angular play, and another two of said elements being slidably fitted for relative play in an axial direction, whereby the inner housing ring with the contained bearing is self-adjustable to suit the shaft alinement and movable with the shaft in response to shaft contraction and expansion.

6. A shaft bearing device comprising two adjacent symmetrical trains of tapered bearing rollers, concentric bearing rings therefor, a housing ring, a shaft sleeve, the inner of said bearing rings being fitted on said sleeve and the outer of said bearing rings being fitted in said housing ring, said housing ring having means cooperative with the outer of said bearing rings and said sleeve having means cooperative with the inner of said bearing rings for positioning the bearing parts in operative assembly with said sleeve and housing ring, one of said means adjustable for adjusting the bearing to take up wear, and a support in which said housing ring is mounted with capacity for universal rocking motion about the center of the bearing to accommodate the housing ring and contained bearing to the shaft alinement.

7. A shaft bearing device comprising two adjacent symmetrical trains of tapered bearing rollers, concentric bearing rings therefor, a housing ring, a shaft sleeve, the inner of said bearing rings being fitted on said sleeve and the outer of said bearing rings being fitted in said housing ring, said housing ring having means cooperative with the outer of said bearing rings and said sleeve having means cooperative with the inner of said bearing rings for positioning the bearing parts in operative assembly with said sleeve and housing ring, one of said means adjustable for adjusting the bearing to take up wear, and a support in which said housing ring is mounted, said housing ring being freely movable axially in said support to enable the housing ring and contained bearing to move axially with the shaft in response to shaft contraction and expansion.

8. A shaft bearing device comprising two adjacent symmetrical trains of tapered bearing rollers, concentric bearing rings therefor, a housing ring, a shaft sleeve, the inner of said bearing rings being fitted on said sleeve and the outer of said bearing rings being fitted in said housing ring, said housing ring having means cooperative with the outer of said bearing rings and said sleeve having means cooperative with the inner of said bearing rings for positioning the bearing parts in operative assembly with said sleeve and housing ring, one of said means adjustable for adjusting the bearing to take up wear, and a support in which said housing ring is mounted with capacity for universal rocking motion about the center of the bearing and for axial motion to accommodate the housing ring and contained bearing to the shaft alinement and to enable them to move axially with the shaft in response to shaft contraction and expansion.

9. A shaft bearing device comprising a plurality of interfitted concentric housings, one slidable axially in another, central shaft clamping means, and a duplex bearing comprising adjacent trains of bearing rollers arranged to sustain equally the radial load and respectively to sustain the opposite axial thrusts and concentric outer and inner bearing rings for said roller trains, the said bearing being mounted on said shaft clamping means and in the inner of said housings, there being provision for adjusting the running clearance between the elements of the bearing and for maintaining the bearing in fixed relation to the inner housing and shaft clamping means.

10. A shaft bearing device comprising a plurality of interfitted concentric housings, one having a spherically surfaced bearing in the surrounding housing, central shaft clamping means, and a duplex bearing comprising adjacent trains of bearing rollers arranged to sustain equally the radial load and respectively to sustain the opposite axial thrusts and concentric outer and inner bearing rings for said roller trains, the said bearing being mounted on said shaft clamping means and in the inner of said housings, there being provision for adjusting the running clearance between the elements of the bearing and for maintaining the bearing in fixed relation to the inner housing and shaft clamping means.

11. A shaft bearing device comprising a plurality of interfitted concentric housings, the bearings of said housings in one another permitting axial and angular play of the inner housing, central shaft clamping means, and a duplex bearing comprising adjacent trains of bearing rollers arranged to sustain equally the radial load and respectively to sustain the opposite axial thrusts and concentric outer and inner bearing rings for said roller trains, the said bearing being mounted on said shaft clamping means and in the inner of said housings, there being provision for adjusting the running clearance between the elements of the bearing and for maintaining the bearing in fixed relation to the inner housing and shaft clamping means.

12. A shaft bearing device comprising two adjacent symmetrical trains of tapered bearing rollers, concentric bearing rings therefor, a housing ring in which the outer bearing rings are fitted, said housing ring having a central internal rib abutted by the outer bearing rings, a shaft sleeve on which the inner bearing rings are fitted, said sleeve having split threaded ends, contractile collars screwed on said ends cooperating with the inner bearing rings for positioning the bearing, means for contracting said collars to secure the sleeve on a shaft, and locking means for said collars to secure a desired adjustment of the bearing.

In testimony whereof, I have signed my name to this specification.

GEORGE N. VAN DERHOEF.